United States Patent [19]

Schotthoefer et al.

[11] 3,895,821

[45] July 22, 1975

[54] INFLATION APPARATUS FOR SAFETY DEVICE

[75] Inventors: Jerome W. Schotthoefer, New Baltimore; Arduino Colasanti, Detroit, both of Mich.

[73] Assignee: Allied Chemical Corporation, New York, N.Y.

[22] Filed: June 1, 1973

[21] Appl. No.: 365,907

[52] U.S. Cl.............................. 280/150 AB; 222/5
[51] Int. Cl. ........................................... B60r 21/06
[58] Field of Search ................... 280/150 AB; 222/5

[56] References Cited
UNITED STATES PATENTS
3,786,843  1/1974  Stephenson .................. 280/150 AB
3,806,153  4/1974  Johnson....................... 280/150 AB

*Primary Examiner*—Trygve M. Blix
*Assistant Examiner*—Galen L. Barefoot
*Attorney, Agent, or Firm*—Ernest D. Buff; Jonathan Plaut

[57] ABSTRACT

Improved inflation apparatus adapted to be disposed in a motor vehicle for inflating a bag with a hybrid combination of pressurized gas and gas generated by gas generating material upon impact of the vehicle. In the improved apparatus, the pressurized gas is separated from the interior of the bag and from the gas generating by a single seal, whereby generated gas mixes with and heats the pressurized gas in a highly efficient manner.

10 Claims, 4 Drawing Figures

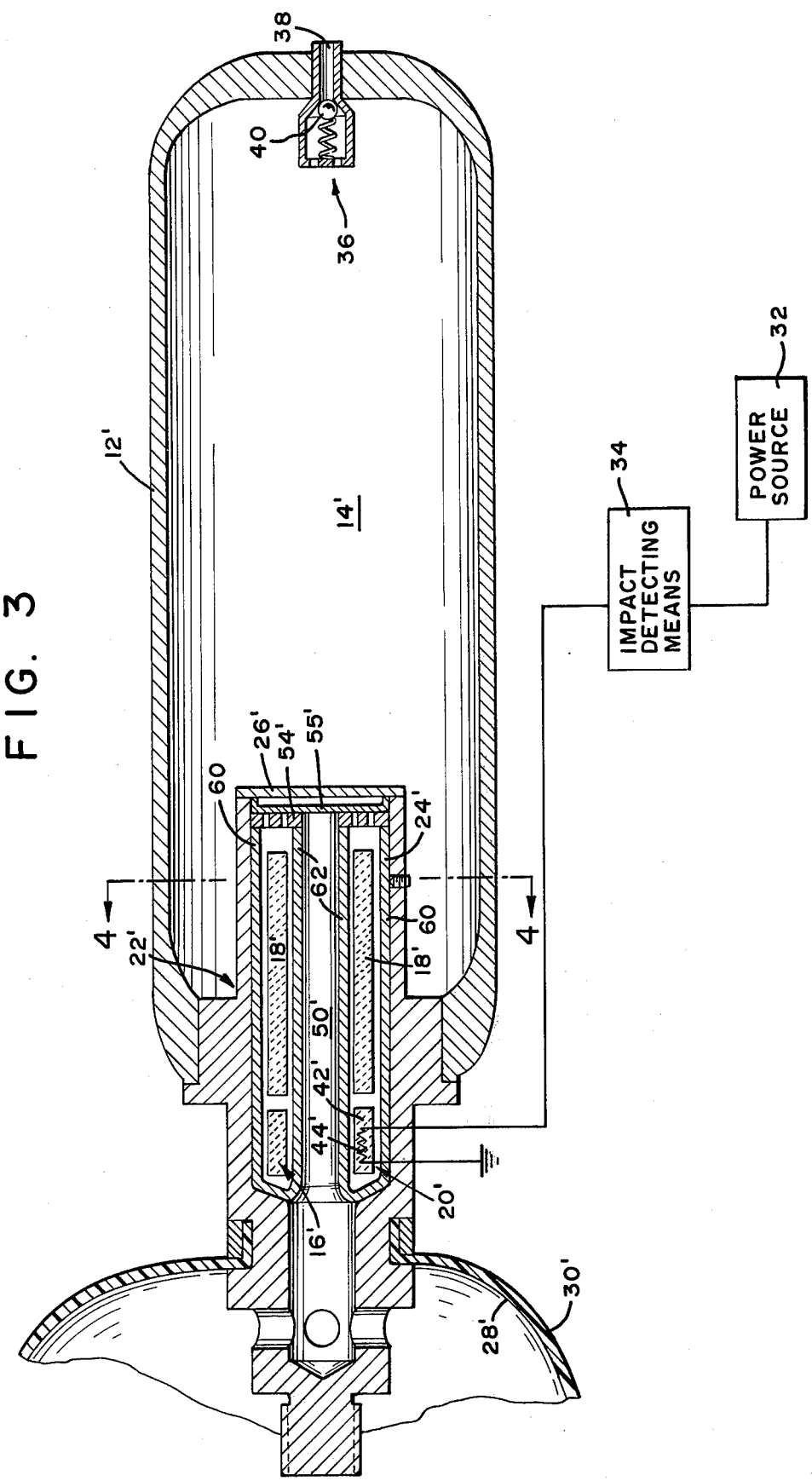

INFLATION APPARATUS FOR SAFETY DEVICE

BACKGROUND OF THE INVENTION

1. Field of the Invention

This invention relates to safety apparatus for passengers or other mobile objects in a motor vehicle, such as an automobile, and more particularly to apparatus for inflating a bag with gas upon collision of the vehicle.

2. Description of the Prior Art

Inflatable bag restraint systems have been recently developed which should significantly decrease the number of fatalities and serious injuries resulting from motor vehicle accidents. Such systems conventionally include a hybrid gas source containing pressurized gas and gas generating material disposed within a vehicle and a gas releasing mechanism connected to the gas source for releasing the hybrid gas into the bag when the vehicle is involved in a collision. The time interval required for inflation of the bag is relatively small (e.g. less than 40 milliseconds). Hence, a considerable quantity of pressurized gas and gas generating material is required for inflation of the bag. The size of the gas source depends primarily on the quantity of pressurized gas and gas generating material contained therein. Moreover, the walls of the gas source must have sufficient strength to withstand the high gas pressures exerted therewithin during inflation of the bag. Both the side and the weight of the gas source are therefore substantial. The capital and operating costs of inflatable restraint systems tend to increase in proportion to the size and weight of the gas source. A current trend toward functional, compact motor vehicles has increased the difficulty of providing sufficient space within such vehicles to accommodate inflatable restraint systems. It would be particularly advantageous if inflation apparatus having a smaller, lighter gas source and capable of reducing the inflation time interval were available, but up to the present time no satisfactory apparatus of this type has been produced. As a result, inflation apparatus of the type described has generally resulted in slower inflation rates and higher purchase, installation and maintenance costs than are considered to be commercially acceptable.

SUMMARY OF THE INVENTION

The present invention provides a compact, light weight bag inflation apparatus adapted to be disposed in a vehicle subject to impact for rapidly inflating a bag upon receipt of an electrical current from an impact detecting means responsive to impact of the vehicle. Briefly stated, the inflation apparatus has a gas-containing means provided with a pressurized gas, gas generating means provided with gas generating material, actuating means for igniting the gas generating material upon receipt of the electrical current to form a generated gas and gas releasing means associated with the gas-containing means for effecting release of the pressurized and generated gases. The gas releasing means comprises (i) housing means containing the gas generating means and (ii) sealing means separating the pressurized gas from each of the gas generating means and the bag and being adapted to rupture upon ignition of the gas generating material, whereby gas released from the gas-containing means and from the gas generating means flows into and inflates the bag.

In a more specific embodiment of the invention, the gas releasing means includes a conduit in communication with the interior of the bag. The conduit is separated from the pressurized gas by the sealing means and is separated from the gas generating means by the housing means. In another embodiment of the invention, the gas releasing means includes casing means having an interior surface. The casing means surrounds substantially the entire exterior surface of the housing means and cooperates therewith to form a conduit dimensionally defined by the exterior surface of the housing means and the interior surface of the casing means. The conduit communicates with the interior of the bag and is separated from the pressurized gas and gas generating means by the sealing means and the housing means, respectively.

When a vehicle equipped with the inflation apparatus is involved in a collision, the impact detecting means transmits an electrical current from a source of electrical power to the actuating means. The actuating means ignites the gas generating material and generated gas ruptures the sealing means. An outlet is thereby provided by the gas releasing means which places the gas-containing means in communication with the conduit and the interior of the bag. Generated gas is introduced into the gas-containing means wherein it becomes admixed with the pressurized gas. The combined pressurized and generated gases pass through the conduit and into the bag, which is rapidly inflated by the gases.

Heat generated by combustion of the gas generating material raises the temperature of the housing means. During passage through the conduit the pressurized gas is heated by direct contact with the exterior surface of the housing, as well as by direct contact with the generated gas. The inflation apparatus thereby operates to heat the pressurized gas in a highly efficient manner. Hence, the quantity of pressurized gas and gas generating material used for inflation of the bag, as well as the time interval required for inflation, can be reduced. Further, the pressurized gas is separated from the interior of the bag and from the actuating means by a single sealing means with the result that the actuating means is more easily fabricated and less subject to failure than actuating mechanisms which communicate with the pressurized gas or require a separate seal. As a result, the inflation apparatus of this invention is smaller, lighter, less expensive to produce and more reliable in operation than previous apparatus of this nature.

BRIEF DESCRIPTION OF THE DRAWINGS

The invention will be more fully understood and further advantages will become apparent when reference is made to the following detailed description and the accompanying drawings in which:

FIG. 3 is a longitudinal section through an inflation apparatus incorporating an alternate embodiment of the invention.

DESCRIPTION OF THE PREFERRED EMBODIMENTS

Figure 1:
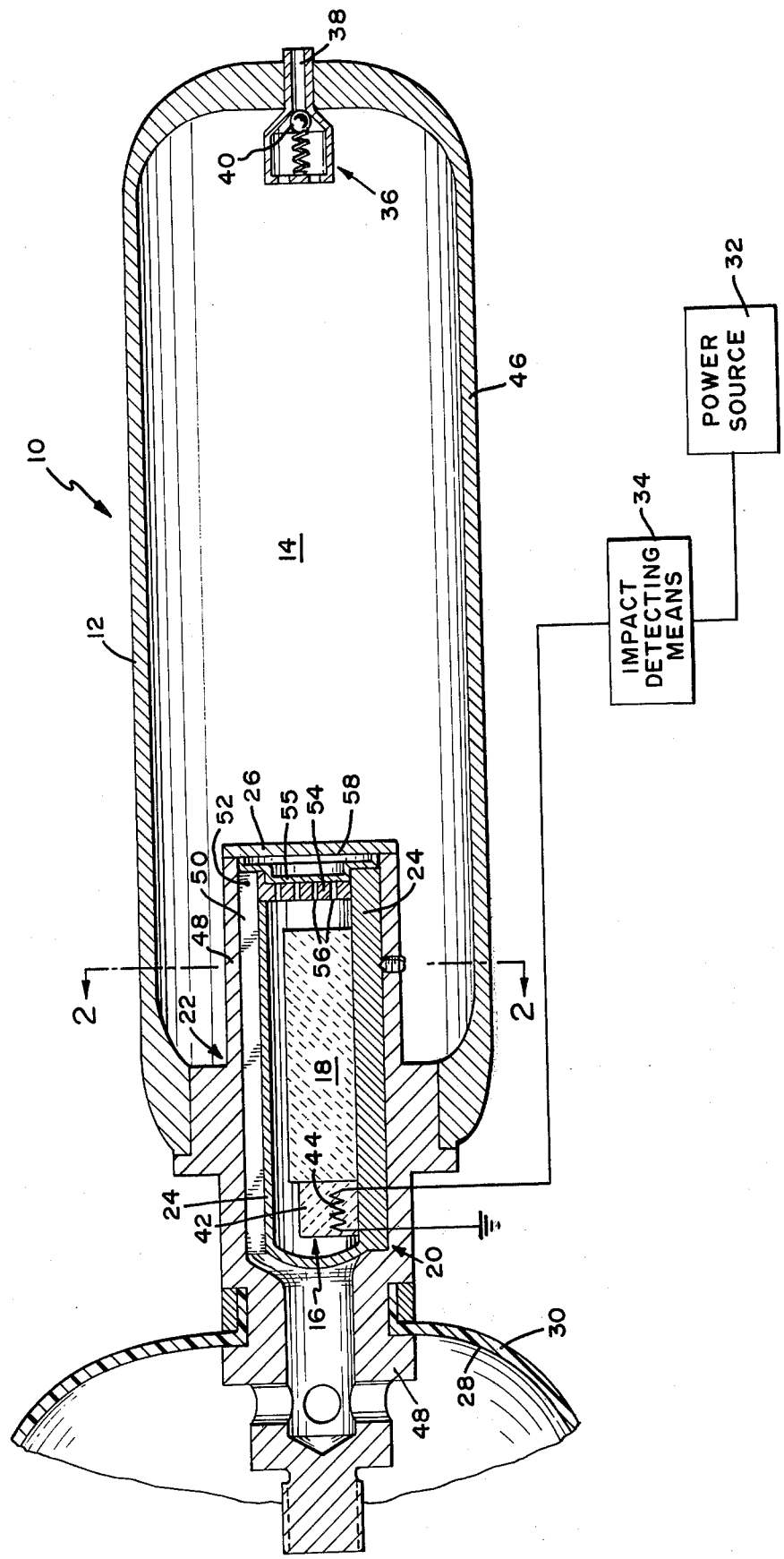
FIG. 1 is a longitudinal section taken along the line 1—1 of FIG. 2, showing one form of an inflation apparatus incorporating the present invention.
Figure 2:
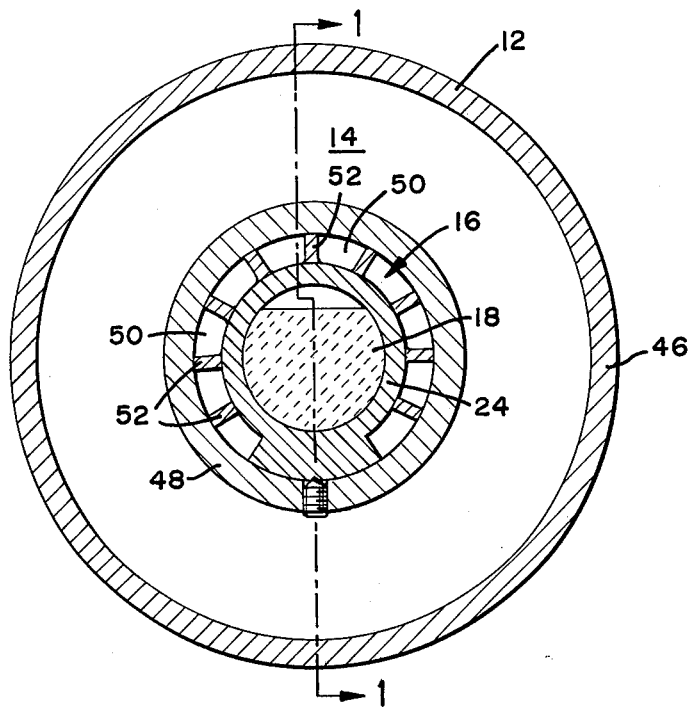
FIG. 2 is a sectional view taken along the line 2—2 of FIG. 1.

Referring to FIGS. 1 and 2 of the drawings, there is illustrated a preferred form of an inflation apparatus incorporating the present invention. Other forms of inflation apparatus can also be used. The inflation apparatus, shown generally at 10, should therefore be interpreted as illustrative and not in a limiting sense. As illustrated, the inflation apparatus 10 has a gas-containing means 12 provided with a pressurized gas 14 and a gas generating means, shown generally at 16, provided with a gas generating material 18, an actuating means, shown generally at 20, for initiating the generation of gas within the gas generating means 16 and a gas releasing means, shown generally at 22, for releasing gas from the gas-containing means 12. The gas releasing means 22 has a housing means 24 which contains the gas generating material 18 and a sealing means 26 which separates the pressurized gas 14 from each of the gas generating material 18 and the interior 28 of an inflatable bag 30. Sealing means 26 is adapted to rupture when generation of gas is initiated. The sealing means 26 can be a frangible diaphragm such as a diaphragm made of nickel, stainless steel, nylon or the like. An electrical current supplied by an electrical power source 32 is directed to the actuating means by an impact detecting means 34 of a vehicle in which the apparatus is disposed. The actuating means 20 ignites the gas generating material 18 upon receipt of the electrical current. Gas generated by combustion of the gas generating material 18 ruptures the sealing means 26 to provide an outlet (not shown) placing the gas-containing means 12 in communication with the interior 28 of bag 30. Generated gas is introduced into the gas-containing means 12 wherein it becomes admixed with the pressurized gas 14. The combined pressurized and generated gases pass through the outlet and into the bag 30 which is rapidly inflated by the gas.

The gas-containing means 12 includes a gas inlet means, shown generally at 36. Gas inlet means 36 may comprise a tapped hole 38 adapted to communicate with a source of pressurized gas (not shown) and a ball check valve 40. The use of the check valve 40 is preferred in order to prevent back flow of the pressurized gas 14. As illustrated, the gas inlet means 36 is disposed at the upstream end of the gas-containing means 12. It should be appreciated that this position of the inlet means 36 is optional and that in other forms of the inflation apparatus 10 the inlet means 36 may be in different positions on the gas-containing means 12. The gas-containing means 12 is filled by injecting a pressurized gas 14 through the gas inlet means 36 until a preselected pressure is attained within the gas-containing means 12. Nitrogen, air or other suitable gas which is not toxic to humans, does not have a deleterious effect on the inflatable bag 30, and can be stored for prolonged periods without leaking from the gas-containing means 12 is generally used as the pressurized gas 14. The pressurized gas 14 is normally contained within the gas-containing vessel at a pressure in the range of about 1000 to 4000 pounds per square inch, and preferably at about 2000 pounds per square inch. In order to accommodate such pressure, the gas-containing means 12 has a volume in the range of about 50 to about 150 cubic inches, and preferably about 100 cubic inches. Pressures exerted within the gas-containing means 12 by admixture of the pressurized (stored) and generated gases may increase the pressure in the gas-containing means 12 to a pressure in the range of about 3000–5000 psi or more.

The gas generating means 16 may contain the actuating means 20, including a squib 42. Squib 42 is structurally connected to a resistance element, such as a bridge wire 44, which will produce a suitable volume of resistivity to heat and ignite the squib 42 upon passage of an electrical current therethrough. The bridge wire 44 is electrically connected to impact detecting means 34, which is adapted to transmit an electrical current from power source 32 to bridge wire 44 upon impact of a vehicle in which inflation apparatus 10 is disposed. The gas generating means is provided with the gas generating material 18 disposed adjacent to the squib 42. Single base propellant such as nitrocellulose, composite propellant such as ammonium perchlorate-polyvinyl chloride, or other propellant material which generates gas and heat upon combustion can be used as the gas generating material 18.

The volume and pressure of the pressurized gas 14 selected will depend upon the volume of the inflatable bag, and the pressure and volume of gas produced by the gas generating material 18. In the embodiment shown in the drawing, the volume and pressure of the pressurized gas 14 is at least about 25 percent of the volume and pressure of gas generated by combustion of the gas generating material 18. The volume of gas stored within the gas-containing means can be varied in order to maximize the high pressure gas potential and minimize the volume of the gas source. In a preferred embodiment of the invention, the pressurized gas 14 is stored within the gas-containing means 12 at sufficient pressure and volume to substantially fill the bag 30.

Because of the pressures which are maintained within the gas-containing means 12, the latter is provided with a relatively thick wall 46. The thickness of the wall 46 is designed so as to insure the structural integrity thereof if the wall 46 is subjected to pressures in excess of those anticipated. Preferably, the wall 46 is constructed of heat treated steel or other suitable metal.

The gas releasing means 22 can be constructed in a variety of configurations which afford sufficient structural capacity to withstand the pressures exerted thereon during generation and release of the gas. In the embodiment illustrated herein, the gas releasing means has a housing means 24 adapted to contain the generating means 16. The housing means 24 is constructed of heat treated steel or other suitable metal and has an exterior surface substantially cylindrical in shape. A casing means 48, constructed of steel or other suitable material, surrounds substantially the entire exterior surface of the housing means 24. Sufficient space is provided between the exterior surface of the housing means 24 and the interior surface of the casing means 48 to form a conduit 50 through which gas can be passed. The conduit 50 communicates with the interior 28 of bag 30 and is separated from the pressurized gas 14 and gas generating material 18 by sealing means 26 and housing means 24, respectively. The sealing means 26 consists of a first portion separating pressurized gas 14 from gas generating means 16 and a second portion separating the pressurized gas 14 from conduit 50, each of the first and second portions of the sealing means 26 having uniform sealing strength.

A plurality of support baffles 52 may be disposed in conduit 50 and connected between housing means 24 and casing means 48 to maintain the space between housing means 24 and casing means 48 during generation and release of the gas. The casing means 48 has sufficient thickness to withstand pressures in the range of about 3000–5000 psi or more.

A diffuser 54 is disposed at the downstream end of the gas generating means 16 and immediately upstream of sealing means 26. The diffuser 54 contains a plurality of passageways 56 which evenly distribute the pressure of the generated gas over surface 58 of sealing means 26. In addition, the diffuser 54 causes gas generated within the gas generating means 16 to move into the gascontaining means 12 at a uniform pressure and velocity.

The impact detecting means 34 may have a variety of configurations. One form of impact detecting means which is suitable is described in U.S. Pat. No. 3,688,063 to Bell. The power source 32 may be a primary or storage battery having an electrical potential of about 12 volts and typically comprises the storage battery of the vehicle.

The time interval required for inflation of bag 30 depends upon the cross-sectional area of conduit 50, the amount and type of pressurized gas and gas generating material employed and the construction of the sealing means 26. In the embodiment shown, conduit 50 has a cross-sectional area of about 0.2 to 1.2 square inches. The sealing means 26 is a nickel diaphragm about 0.75 to 1.25 inches in diameter by about 0.010 to 0.050 inch thick and is adapted to rupture when pressure developed within the gas generating means by combustion of gas generating material exceeds a predetermined pressure of at least about 150 psi. Such a predetermined pressure is obtained within at least about 2 milliseconds following ignition of the gas generating material. The bag 30 becomes totally inflated by the apparatus 10 within a time interval of about 5–50 milliseconds upon collision of a vehicle equipped therewith.

Although the sealing means 26 has been described hereinabove as being adapted to be ruptured by pressure developed within the gas generating means, the sealing means 26 can alternatively be adapted to be ruptured by mechanical means, such as a piston, movable disc, or the like. For example, a mechanical means having the form of a rigid plate 55 constructed of stainless steel or other suitable metal could be slidably disposed in the gas releasing means 22 between diffuser 54 and sealing means 26 and adapted to be driven forward or otherwise displaced into rupturing contact with the sealing means 26 upon ignition of the gas generating material 18. In either case, a rupture means is provided which is disposed adjacent to the sealing means 26 and is so constructed as to direct rupturing force against each of the first and second portions of the sealing means 26 upon ignition of the gas generating material 18, the rupture means contacting the second portion of the sealing means 26 directly at the conduit 50.

Figure 4:
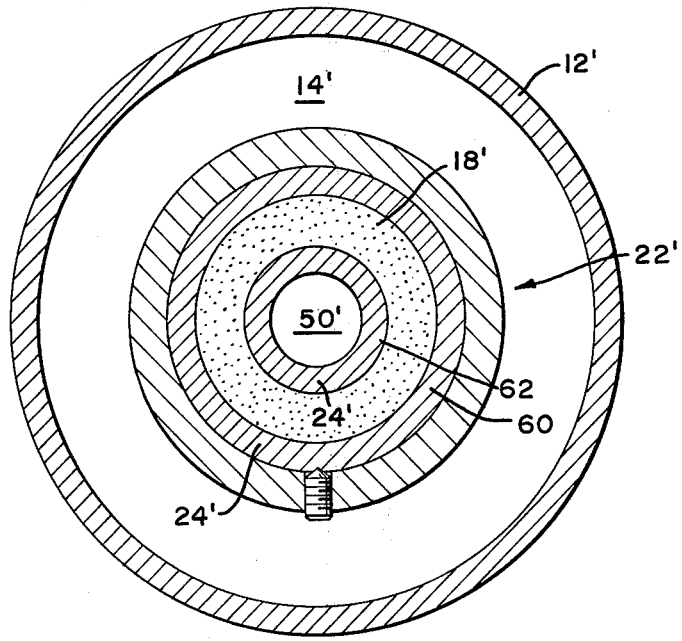
FIG. 4 is a sectional view taken along the line 4—4 of FIG. 3.

In FIGS. 3 and 4 there is illustrated an alternate embodiment of the invention. The gas releasing means 22' of this embodiment is provided with housing means 24' having a substantially annular configuration. Gas generating means 16', including gas generating material 18' and actuating means 20', is disposed within the substantially annular space provided between inner and outer walls 60 and 62, respectively, of housing means 24'. Outer wall 62 of housing means 24' defines a conduit 50' which communicates with the interior 28' of bag 30'. The conduit is separated from the pressurized gas 14' by sealing means 26' and is separated from the gas generating material 18' by the housing means 24'.

The sealing means 26' may be adapted to be ruptured by pressure developed within the gas generating means 16' or, alternatively, by mechanical means 55' of the type shown at 55 in FIG. 1.

The operation of the apparatus 10 can be readily comprehended by reference to FIG. 1. Impact detecting means 34 transmits an electrical current from power source 32 to bridge wire 44 upon impact of a vehicle in which the apparatus 10 is disposed. The bridge wire 44 heats and ignites squib 42 and combustion of gas generating material 18 commences. Generated gas passes through diffuser 54 to impinge on and rupture sealing means 26. An outlet (not shown) is thereby provided in the gas releasing means 22 which places the gas-containing means 12 in communication with conduit 50 and the interior 28 of bag 30. Generated gas is introduced into gas-containing means 12 wherein it becomes admixed with pressurized gas 14. The combined pressurized and generated gases flow from the gas-containing means 12 through conduit 50 and into bag 30 which is rapidly inflated and disposed between hard portions of the vehicle and passengers or other mobile objects contained therein.

Gas generated within gas generating means 16 flows into the gas-containing means 12 in a substantially single direction. The direction of flow through conduit 50 is substantially the reverse of the flow direction within the gas generating means 16.

Heat generated by combustion of gas generating material 18 raises the temperature of housing means 24. During passage through the conduit 50 the pressurized gas 14 is heated by direct contact with the exterior surface of the housing means 24. Surprisingly, the amount of heat conventionally lost by the gas during passage from the gas-containing means 12 to the inflatable bag 30 is reduced considerably. The structure of the gas releasing means thus provides for increased heat transfer between the pressurized and generated gases. In addition, the generated gas is introduced into and exits gas-containing means 12 in substantially opposite directions, whereby mixing of the pressurized and generated gases is effected in a highly efficient manner. Thus, the quantity of pressurized gas 14 and gas generating material 18 used for inflation of the bag 30 as well as the time interval required for inflation can be reduced. Further, the pressurized gas 14 is separated from the interior 28 of bag 30 and from the actuating means 20 by a single sealing means 26, with the result that the actuating means 20 is more easily fabricated and less subject to failure than actuating mechanisms which communicate with the pressurized gas or require a separate seal. Accordingly, the bag inflation of the present invention is small, light, inexpensive to produce and highly reliable in operation.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. Inflation apparatus adapted to be disposed in a vehicle for inflating a bag upon receipt of an electrical current from an impact detecting means responsive to impact of the vehicle, comprising:

a. gas-containing means provided with a pressurized gas;

b. gas generating means provided with a gas generating material;
c. actuating means for igniting the gas generating material upon receipt of the electrical current to form a generated gas; and
d. gas releasing means associated with said gas-containing means and having a conduit in communication with the interior of said bag, said gas releasing means comprising:
  i. housing means containing said gas generating means;
  ii. sealing means consisting of a first portion separating said pressurized gas from said gas generating means and a second portion separating said pressurized gas from said conduit, said first and second portions having uniform sealing strength; and
  iii. rupture means disposed adjacent to said sealing means for applying rupturing force thereagainst, said rupture means being so constructed as to direct said rupturing force against each of said first and second portions of said sealing means upon ignition of said gas generating materials, the rupture means contacting said second portion of said sealing means directly at said conduit, whereby gas released from said gas-containing means and said gas generating means flows into and inflates the bag.

2. Inflation apparatus as recited in claim 1 wherein said conduit is separated from said gas generating means by said housing means.

3. Inflation apparatus as recited in claim 1, wherein said gas releasing means includes casing means having an interior surface, said casing means surrounding substantially the entire exterior surface of said housing means and cooperating therewith to form a conduit dimensionally defined by the exterior surface of said housing means and the interior surface of said casing means.

4. Inflation apparatus as recited in claim 3, wherein and said housing means separates said conduit from said gas generating means.

5. Inflation apparatus as recited in claim 2, wherein said housing means is a unitary structure.

6. Inflation apparatus as recited in claim 2 wherein said rupture means includes mechanical means disposed in said gas releasing means, said mechanical means being adapted to be displaced into rupturing contact with each of said first and second portions of said sealing means upon ignition of said gas generating material.

7. Inflation apparatus as recited in claim 6 wherein said mechanical means is a substantially rigid plate.

8. Inflation apparatus as recited in claim 3, wherein said gas releasing means includes a plurality of baffles disposed in said conduit and connected between said housing means and said casing means.

9. Inflation apparatus as recited in claim 2, wherein said housing means has a substantially cylindrical shape.

10. Inflation apparatus as recited in claim 2, wherein said housing means has a substantially annular configuration.

* * * * *